(12) United States Patent
Patwardhan et al.

(10) Patent No.: US 10,564,897 B1
(45) Date of Patent: Feb. 18, 2020

(54) METHOD AND SYSTEM FOR CREATING VIRTUAL SNAPSHOTS USING INPUT/OUTPUT (I/O) INTERCEPTION

(71) Applicant: EMC IP Holding Company LLC, Hopkinton, MA (US)

(72) Inventors: Kedar S. Patwardhan, Irvine, CA (US); Rajesh K. Nair, San Jose, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 84 days.

(21) Appl. No.: 16/049,556

(22) Filed: Jul. 30, 2018

(51) Int. Cl.
| | |
|---|---|
| *G06F 12/00* | (2006.01) |
| *G06F 13/00* | (2006.01) |
| *G06F 3/06* | (2006.01) |
| *G06F 13/16* | (2006.01) |
| *G06F 16/17* | (2019.01) |

(52) U.S. Cl.
CPC ............ *G06F 3/0659* (2013.01); *G06F 3/061* (2013.01); *G06F 3/0664* (2013.01); *G06F 3/0673* (2013.01); *G06F 13/1668* (2013.01); *G06F 16/1734* (2019.01)

(58) Field of Classification Search
CPC .... G06F 16/1734; G06F 3/0659; G06F 3/061; G06F 3/0664; G06F 13/1668; G06G 3/0673
See application file for complete search history.

(56) References Cited

U.S. PATENT DOCUMENTS

| | | | | |
|---|---|---|---|---|
| 9,542,397 | B1 * | 1/2017 | Graham | G06F 3/0619 |
| 9,977,716 | B1 * | 5/2018 | Payne | G06F 16/128 |
| 10,200,470 | B1 * | 2/2019 | Chakraborty | H04L 67/1095 |
| 10,417,098 | B2 * | 9/2019 | Fruchtman | G06F 11/1458 |
| 2004/0088331 | A1 * | 5/2004 | Therrien | G06F 11/1448 |
| 2011/0246706 | A1 * | 10/2011 | Gomyo | G06F 3/0616 |
| | | | | 711/103 |
| 2014/0006858 | A1 * | 1/2014 | Helfman | G06F 11/1448 |
| | | | | 714/19 |
| 2017/0364681 | A1 * | 12/2017 | Roguine | G06F 21/554 |
| 2018/0276085 | A1 * | 9/2018 | Mitkar | G06F 11/3055 |
| 2018/0357133 | A1 * | 12/2018 | Strogov | G06F 11/1451 |
| 2019/0108340 | A1 * | 4/2019 | Bedhapudi | G06F 21/566 |
| 2019/0108341 | A1 * | 4/2019 | Bedhapudi | G06F 21/566 |
| 2019/0109870 | A1 * | 4/2019 | Bedhapudi | G06F 16/1734 |
| 2019/0370117 | A1 * | 12/2019 | Fruchtman | G06F 11/1451 |

* cited by examiner

*Primary Examiner* — Sean D Rossiter
(74) *Attorney, Agent, or Firm* — Chamberlain, Hrdlicka, White, Williams & Aughtry

(57) ABSTRACT

In general, embodiments of the invention relate to a method for processing input/output (I/O requests). The method includes receiving an I/O request from a virtual machine executing on a host computing device, where the host computing device comprises a filter driver. The method further includes making a first determination that the filter driver is in a backup mode and based on the first determination, making a second determination that the I/O request intersects with a prior filter driver tracking list (FDTL). Further, in response to the second determination, the method includes pausing, by the filter driver, the processing of the I/O request, obtaining, from a primary disk, data associated with the I/O request, after obtaining the data, resuming the processing of the I/O request, where processing the I/O request results in the data on the primary disk being overwritten with new data.

20 Claims, 7 Drawing Sheets

METHOD AND SYSTEM FOR CREATING VIRTUAL SNAPSHOTS USING INPUT/OUTPUT (I/O) INTERCEPTION

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, in one aspect, the invention relates to A method for processing input/output (I/O) requests, the method comprising receiving an I/O request from a virtual machine executing on a host computing device, wherein the host computing device comprises a filter driver, making a first determination that the filter driver is in a backup mode, based on the first determination, making a second determination that the I/O request intersects with a prior filter driver tracking list (FDTL), in response to the second determination: pausing, by the filter driver, the processing of the I/O request, obtaining, from a primary disk, data associated with the I/O request, after obtaining the data, resuming the processing of the I/O request, wherein processing the I/O request results in the data on the primary disk being overwritten with new data.

In general, in one aspect, the invention relates to a system. The system comprises a host computing device executing a virtual machine and comprising a filter driver and a persistent storage operatively connected to the host computing device and comprising a primary disk. The host computing device is configured to, after receiving an I/O request from the virtual machine, make a first determination that the filter driver is in a backup mode, based on the first determination, make a second determination that the I/O request intersects with a prior filter driver tracking list (FDTL), in response to the second determination: pause, by the filter driver, the processing of the I/O request, obtain, from the primary disk, data associated with the I/O request, after obtaining the data, resume the processing of the I/O request, wherein processing the I/O request results in the data on the primary disk being overwritten with new data.

In general, in one aspect, the invention relates to a non-transitory computer readable medium comprising computer readable program code, which when executed by a computer processor enables the computer processor to perform a method, the method includes receiving an I/O request from a virtual machine executing on a host computing device, wherein the host computing device comprises a filter driver, making a first determination that the filter driver is in a backup mode, based on the first determination, making a second determination that the I/O request intersects with a prior filter driver tracking list (FDTL), in response to the second determination: pausing, by the filter driver, the processing of the I/O request, obtaining, from a primary disk, data associated with the I/O request, after obtaining the data, resuming the processing of the I/O request, wherein processing the I/O request results in the data on the primary disk being overwritten with new data.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for creating one or more backups of a primary disk. More specifically, the invention relates to using a filter driver to manage the processing of Input/Output (I/O) requests issued by virtual machine after the generation of a backup has been initiated on the primary disk. In one or more embodiments of the invention, the filter driver intercepts I/O requests and determines whether additional processing is required prior to servicing the I/O request. In this manner, only certain I/O requests are paused. As a result, embodiments of the invention enable the virtual machines to continue to issue I/O requests while the backup is being generated with only minimal impact on the processing of the I/O requests.

Figure 1:
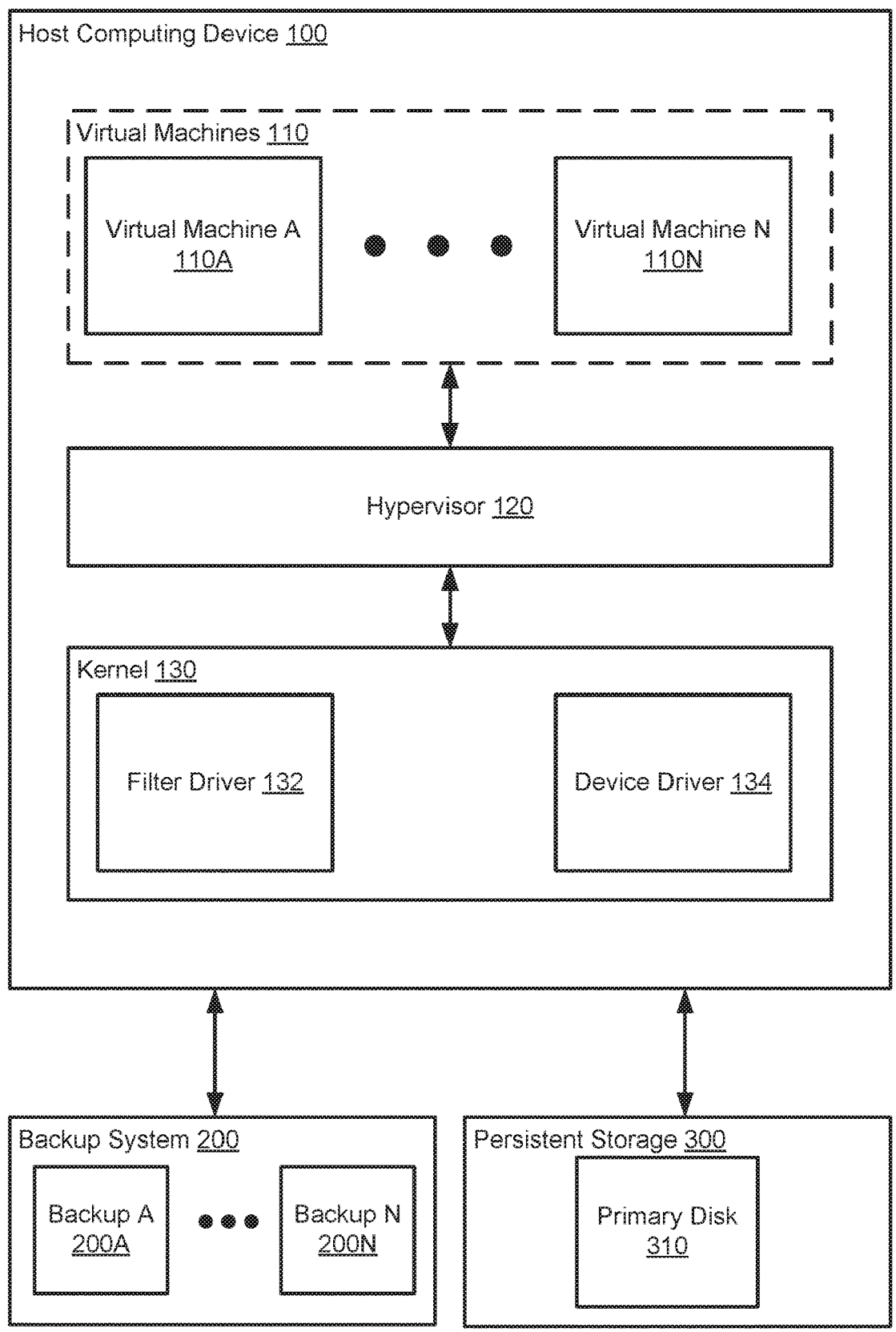
FIG. 1 shows a diagram of a system in accordance with one or more embodiments of the invention.

FIG. 1 shows an example system in accordance with one or more embodiments of the invention. The system includes a host computing device (100), a backup system (200), and persistent storage (300). Each component of the system of FIG. 1 may be operably connected via any combination of wired and/or wireless connections. Each component of the system is discussed below.

In one or more embodiments of the invention, the host computing device (100) hosts virtual machines (110). The virtual machines (110) may be logical entities executed using computing resources (not shown) of the host computing device (100). Each of the virtual machines (110A, 110N) may be performing similar or different processes. In one or more embodiments of the invention, the virtual machines (110) provide services to users, e.g., clients (not shown). For example, the virtual machines (110) may host instances of databases, email servers, and/or other applications. The virtual machines (110) may host other types of applications without departing from the invention. In one or more embodiments of the invention, the virtual machines (110A, 110N) issue input/output (I/O) requests to store data in a primary disk (310).

In one or more of embodiments of the invention, the virtual machines (110A, 101N) are implemented as computer instructions, e.g., computer code, stored on a persistent storage (e.g., on the host computing device) that when executed by a processor(s) of the host computing device (100) cause the host computing device (100) to provide the functionality of the virtual machines (110A, 110N) described throughout this application.

In one or more embodiments of the invention, the host computing device (100) includes a hypervisor (120) that orchestrates the operation of the virtual machines (110). The hypervisor (120) may orchestrate the operation of the virtual machines (110A, 110N) by allocating computing resources to each virtual machine (110A, 110N).

In one or more embodiments of the invention, the hypervisor (120) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (120) described throughout this application.

In one or more of embodiments of the invention, the hypervisor (120) is implemented as computer instructions, e.g., computer code, stored on a persistent storage that when executed by a processor of the host computing device (100) cause the host computing device (100) to provide the functionality of the hypervisor (120) described throughout the application.

In one or more embodiments of the invention, the host computing device (100) includes a kernel (130), which is the core component(s) of the operating system executing on the host computing device. The kernel (130) controls, directly or indirectly, the operation of the host computing device and/or applications executing thereon. In particular, the kernel (130) provides an interface between the computing resources on the host computing system and other components executing on the host computing device (e.g., the hypervisor (120), virtual machine A (110A), virtual machine N (110N), etc.). In one embodiment of the invention, the kernel (130) includes a filter driver (132) and a device driver (134). In one or more embodiments of the invention, the filter driver (132) includes functionality to intercept and process I/O requests issued by one or more virtual machines (110A, 110N). In one embodiment of the invention, the filter drive includes functionality to process the I/O requests in accordance with FIGS. 2A-2C.

In one or more of embodiments of the invention, the filter driver (132) is implemented as computer instructions, e.g., computer code, stored on a persistent storage that when executed by a processor of the host computing device (100) cause the host computing device (100) to provide the functionality of the filter driver (132).

In one or more embodiments of the invention, the device driver (134) includes functionality to service I/O requests after they have been processed by the filter driver. The processing of I/O requests by the device driver may include writing data to a primary disk (310). In one or more of embodiments of the invention, the device driver (134) is implemented as computer instructions, e.g., computer code, stored on a persistent storage that when executed by a processor of the host computing device (100) cause the host computing device (100) to provide the functionality of the device driver (134) described below with respect to FIGS. 2A-2C.

In one or more embodiments of the invention, the backup system (200) stores data and/or provides stored data. The data may be, for example, backups (200A, 200N). The backups (200A, 200N) may be representations of data generated by the virtual machines (110). The backups (200A, 200N) may be used to restore virtual machines to prior states. The backup system (200) may obtain the backups (200A, 200N) from the host computing device (100) and/or from the persistent storage (300). The backup system (200) may store additional data without departing from the invention.

Figure 4:
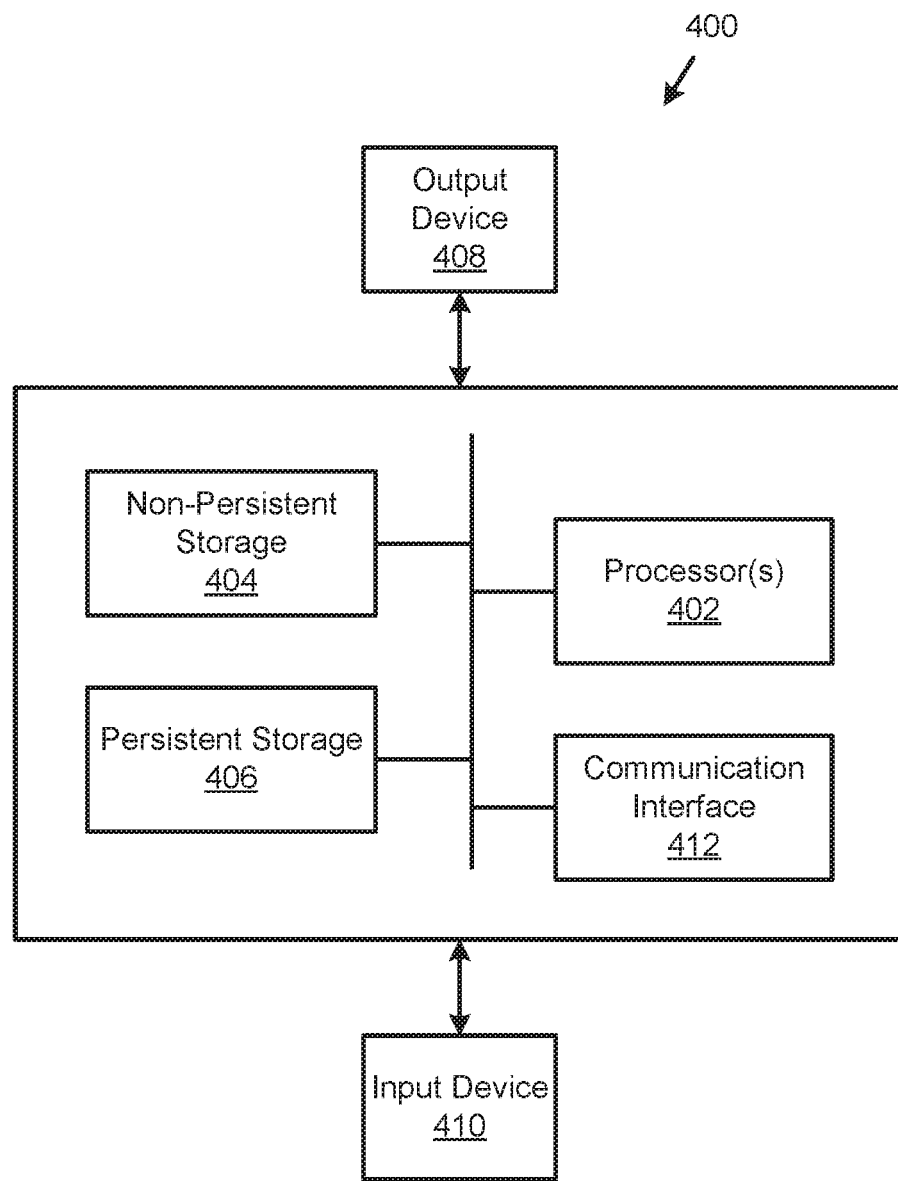
FIG. 4 shows a diagram of a computing device in accordance with one or more embodiments of the invention.

In one or more embodiments of the invention, the backup system (200) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup system (200) described throughout this application.

In one or more embodiments of the invention, the backup system (200) is implemented as a logical device. The logical device may utilize the computing resources of any number of computing devices and thereby provide the functionality of the backup system (200) described throughout this application.

In one or more embodiments of the invention, the persistent storage (300) stores a primary disk (310). The primary disk (310) may be a data structure that is used to generate a backup (200A, 200N) of a virtual machine (110A, 110N). The primary disk (310) may include data written by the device driver (134) in response to I/O requests issued by a virtual machine (110A, 110N).

In one or more embodiments of the invention, the primary disk (310) includes sectors in which data is written and stored. A sector may be a portion of a primary disk. The size of the sector may vary based on the implementation of the invention.

Figure 2A:
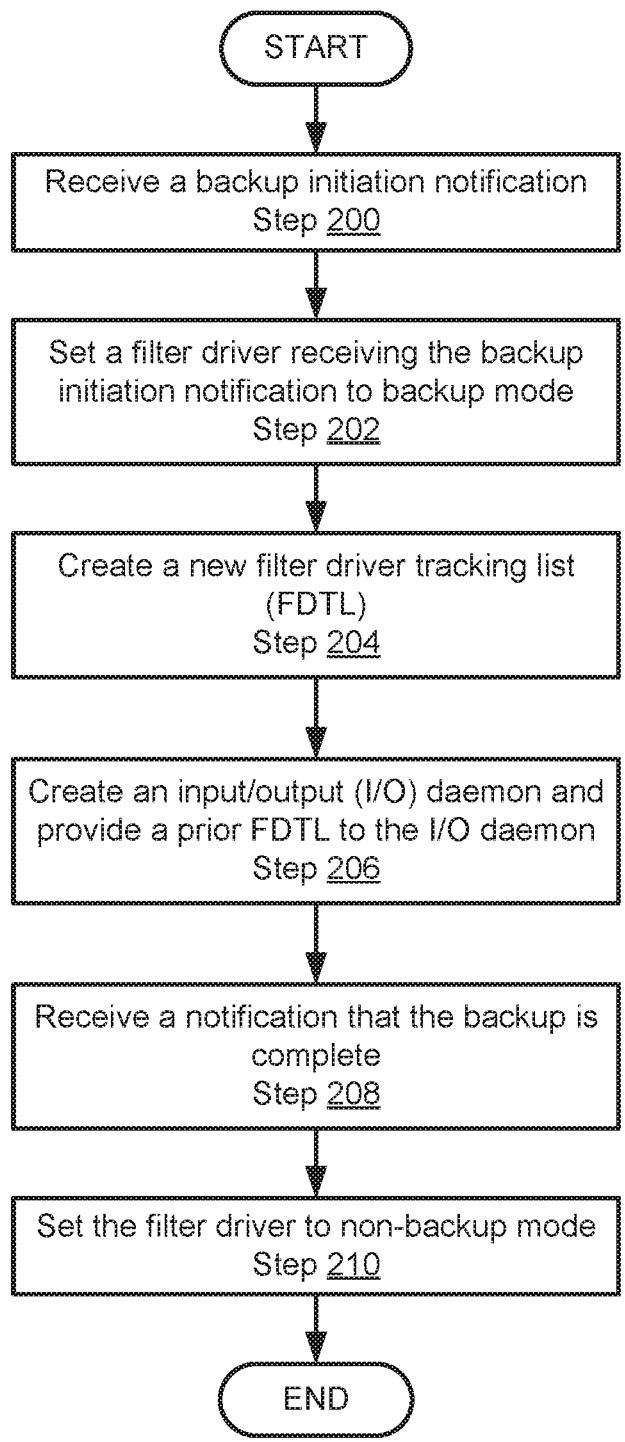
FIG. 2A shows a flowchart for initiating the generation of a backup in accordance with one or more embodiments of the invention.
Figure 2B:
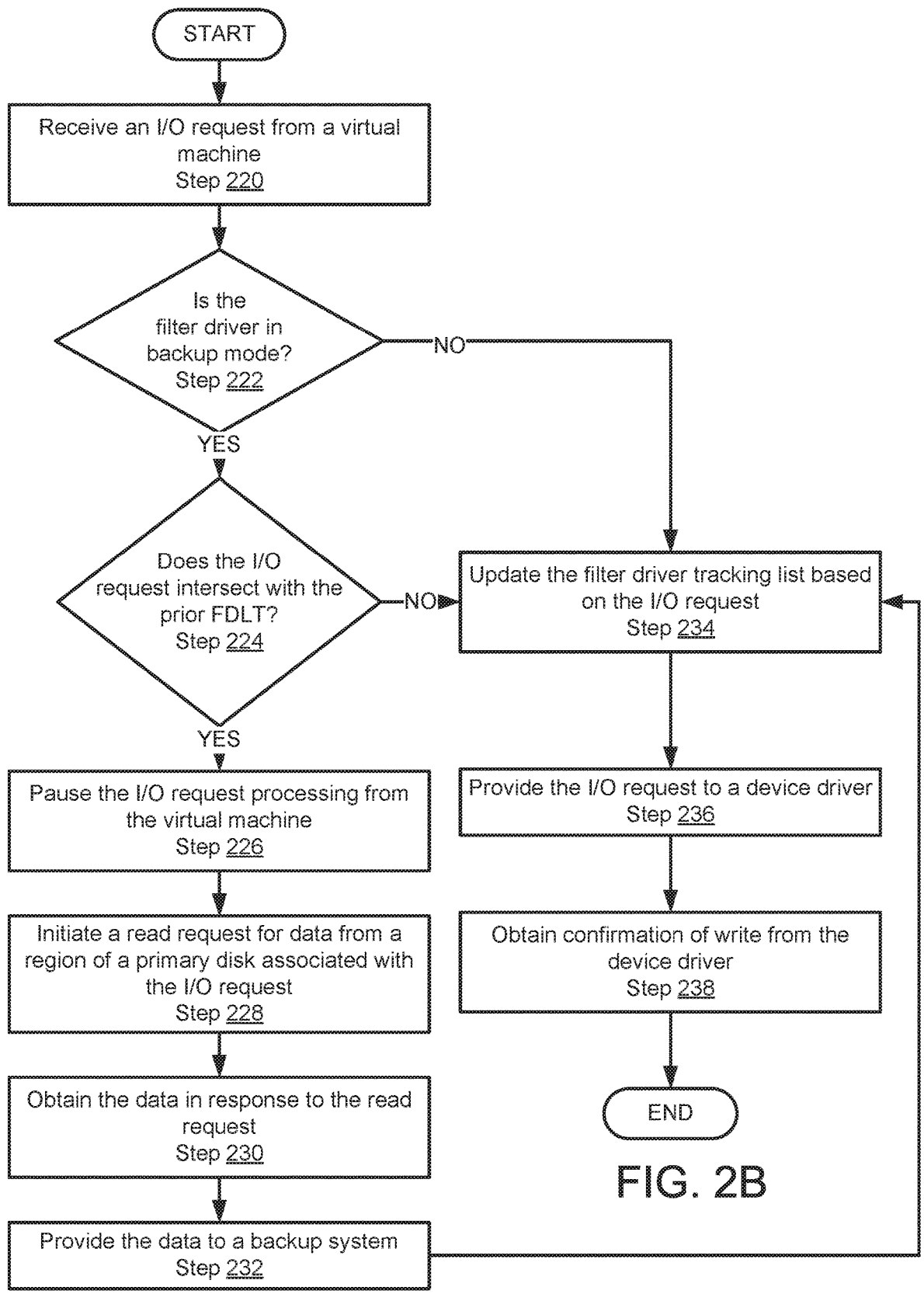
FIG. 2B shows a flowchart for processing Input/Output (I/O) requests in accordance with one or more embodiments of the invention.
Figure 2C:
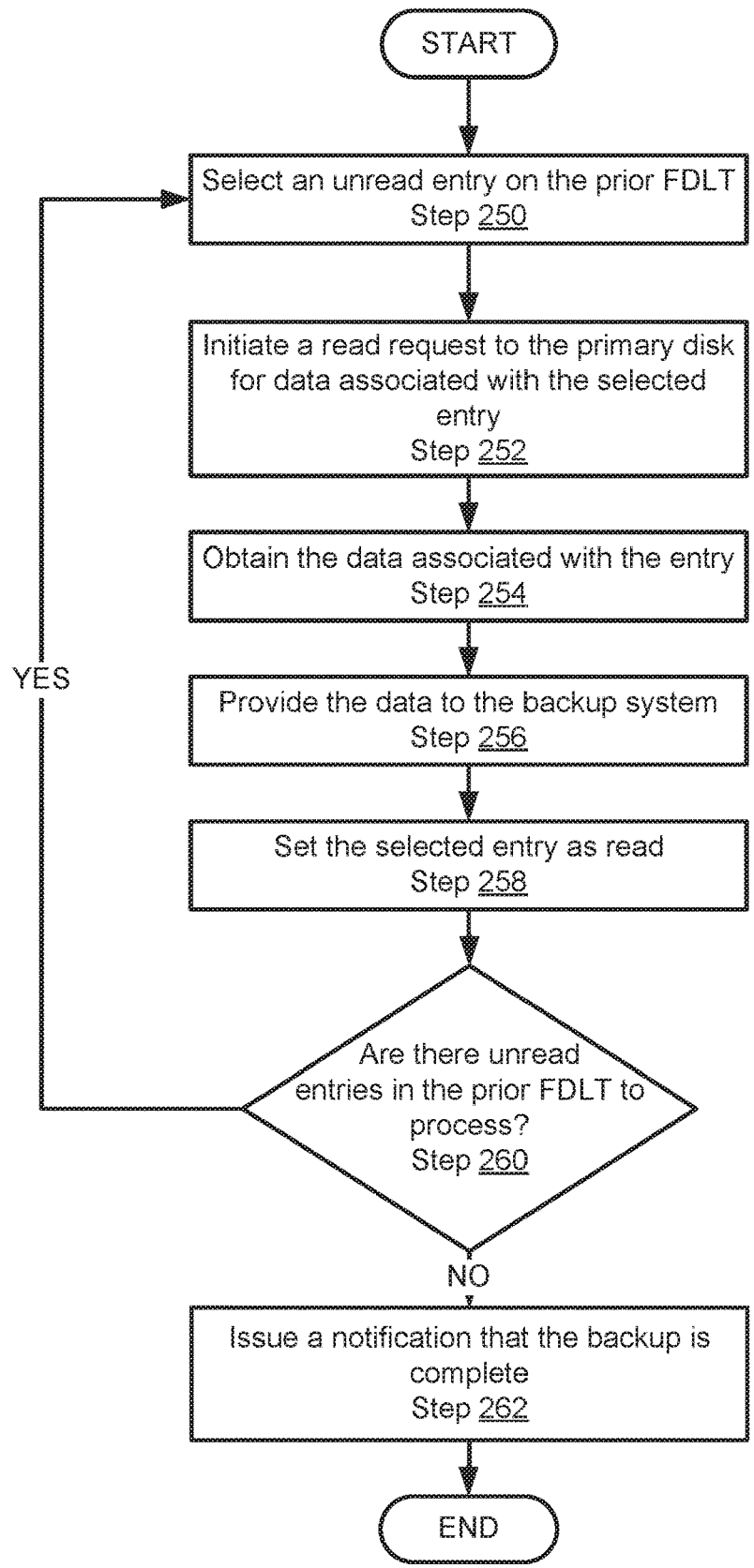
FIG. 2C shows a flowchart for processing entries in a prior FDTL in accordance with one or more embodiments of the invention.

FIGS. 2A-2C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2C may be performed in parallel with any other steps shown in FIGS. 2A-2C without departing from the scope of the invention.

FIG. 2A shows flowcharts for initiating the generation of a backup in accordance with one or more embodiments of the invention. The method shown in FIG. 2A may be performed by, for example, a filter driver (132, FIG. 1). Other components of the system illustrated in FIG. 1 may perform the method of FIG. 2A without departing from the invention.

Turning to FIG. 2A, in Step 200, a backup initiation notification is received by the filter driver. In one or more embodiments of the invention, the backup initiation notification may be issued, for example, by a virtual machine.

In Step 202, in response to receiving the backup initiation notification, the filter driver mode of the filter driver is set to backup mode. Setting the mode of the filter driver to backup mode may correspond to transitioning the mode of the filter driver from a non-backup mode to a backup mode. When the filter driver is in backup mode, the filter driver participates in the generation of a backup, e.g., in accordance with FIG. 2B.

In Step 204, a new filter driver tracking list is created. The new filter driver tracking list (FDTL) is created in response to transitioning the filter driver to the backup mode. In one or more embodiments of the invention, the new FDTL is initially empty (i.e., does not have any entries). The new FDTL is subsequently updated when I/O requests issued by one or more virtual machines result in data being stored in the primary disk. The new FDTL may be used to track changes to sectors of the primary disk relative to the most recently created backup.

In Step 206, an I/O daemon is instantiated by the filter driver. The I/O daemon may execute in the kernel or may execute outside the kernel. In one or more embodiments of the invention, the I/O daemon includes functionality to obtain data in specific sectors of the primary disk and then to provide this obtained data to a backup system. The backup system may use the data to generate a backup. The I/O daemon obtains data from the primary disk using the prior FDTL. The prior FDTL may include entries corresponding to the portions of data. The I/O daemon may process the entries in prior FDTL in accordance with FIG. 2C.

In Step 208, a notification that the backup is complete is received. In one or more embodiments of the invention, the filter driver receives the notification from the I/O daemon after the I/O daemon has processed all entries of the prior FDTL.

In Step 210, in response to the notification, the filter driver is set to non-backup mode. When the filter driver is in non-backup mode, the filter driver does not intercept or otherwise process any of the I/O requests from the virtual machines; rather, the I/O requests are directly processed by the device driver (e.g., I/O requests are processed in accordance with Steps 236-238 of FIG. 2B).

FIG. 2B shows a flowchart for processing Input/Output (I/O) requests in accordance with one or more embodiments of the invention. The method shown in FIG. 2B may be performed by, e.g., a filter driver (132, FIG. 1). Other components of the system illustrated in FIG. 1 may perform the methods of FIG. 2B without departing from the invention.

In Step 220, an I/O request from a virtual machine is received. In one embodiment of the invention, the I/O request may be a write request. The I/O request may specify a sector(s) on a primary disk and the data to be written to the sector(s). The write request may be a request to modify data currently stored on a primary disk, overwrite data that is currently on the primary disk, and/or write new data to the primary disk (i.e., to a location on the primary disk that does not currently store any data).

In Step 222, a determination is made about whether the filter driver is in backup mode. If the filter driver is in backup mode, then method proceeds to Step 224; otherwise, the method proceeds to Step 234.

In Step 224, a determination is made about whether the I/O request intersects with a prior FDTL. If the I/O request intersects with the prior FDTL, the method may proceed to Step 226; otherwise, the process proceeds to Step 234.

In one or more embodiments of the invention, the I/O request intersects with the prior FDTL when the sector specified in the I/O request matches a sector in an unread entry in the prior FDTL.

Based on the determination in Step 224 that the I/O request intersects with the prior FDTL, in 226, processing of the I/O request is paused. In one or more embodiments of the invention, pausing the processing of the I/O request prevents the I/O request from being sent to (or otherwise processed by) the device driver.

In Step 228, a read request for data of a primary disk associated with the I/O request is initiated. In one or more embodiments of the invention, the read request is sent to the device driver by the I/O daemon. The read request specifies the sector(s) on the primary disk from which to read data. The sector(s) specified in the read request correspond to the sector(s) specified in the I/O request.

In Step 230, the data is obtained in response to the read request. In one or more embodiments of the invention, the data corresponds to the data that is read from the sector(s) specified in the read request.

In Step 232, the data is provided to the backup system. In one or more embodiments of the invention, the data is provided to the backup system by the I/O daemon. Upon receipt, the backup system uses the data to generate the backup (i.e., the backup initiated in response to the backup initiation notification received in Step 200). The process then proceeds to Step 234.

Steps 234-236 describe the processing of the I/O request regardless of whether the filter driver is in backup mode or non-backup mode. If the filter driver is in backup mode, then steps 220-232 are performed prior to step 234 and, in such cases, the processing of the I/O request is un-paused (or resumed) after Step 230 (or Step 232). Alternatively, if the filter driver is in non-backup mode, then Steps 220-222 are performed prior to Step 234.

Continuing with the discussion of Step 234, in Step 234, a current FDTL is updated based on the I/O request. In one or more embodiments of the invention, the current FDTL includes changes made to a primary disk after a most recent backup associated with the primary disk has been generated (or which is currently being generated). More specifically, if the current FDTL is updated while the filter driver is in backup mode, then the most recent backup is the backup being generated while the filter driver is in backup mode.

In Step 236, the I/O request is provided to a device driver. The device driver subsequently processes the I/O request. In one embodiment of the invention, processing the I/O request includes writing data to the primary disk at the sector(s) specified in the I/O request.

In Step 238, a confirmation of a successful write from the device driver may be obtained (or received). The confirmation indicates that the data was successfully written to the primary disk. The method shown in FIG. 2B may be performed for each I/O request issued by any of the virtual machines on the host computing device.

FIG. 2C shows a flowchart for processing entries in a prior FDTL in accordance with one or more embodiments of the invention. The method shown in FIG. 2C may be performed by, for example, an I/O daemon. Other components of the system illustrated in FIG. 1 may perform the method of FIG. 2C without departing from the invention.

The method shown in FIG. 2C may be initiated after the I/O daemon has been initiated (see e.g. FIG. 2A, step 206).

In Step 250, an unread entry on the prior FDTL is selected. The entries in the tracking list may be ordered, e.g., based on sector numbers. In one or more embodiments of the invention, the I/O daemon selects an entry in the prior FDTL in a predetermined order. Alternatively, if in FIG. 2B, Step 224, the filter driver determines that there is an intersection between the I/O request and the prior FDTL, then the selected unread entry corresponds to the I/O request in step 228.

In Step 252, a read request to the primary disk is initiated for data associated with the selected entry. In one or more embodiments of the invention, the read request is initiated by sending the read request to the device driver to obtain data from a primary disk.

In Step 254, the data associated with the entry is obtained by the I/O daemon. More specifically, I/O daemon obtains data from the primary disk in the sector(s) specified in the read request.

In Step 256, the data is provided to the backup system. In one or more embodiments of the invention, I/O daemon sends the data to the backup system. The backup system may then use the data to generate a backup.

In Step 258, the selected entry is marked as read.

In Step 260, it is determined whether there are unread entries in the prior FDTL. If there are unread entries in the prior FDTL, the method may proceed to Step 250. If there are no unread entries in the prior FDTL, the method may proceed to Step 262.

In Step 262, a notification of backup completion is issued to the filter driver. In one or more embodiments of the invention, the I/O daemon sends a notification to the filter driver after processing all entries in the prior FDTL. The filter driver may use the notification to transition the filter driver to the non-backup mode.

EXAMPLE

Figure 3A:
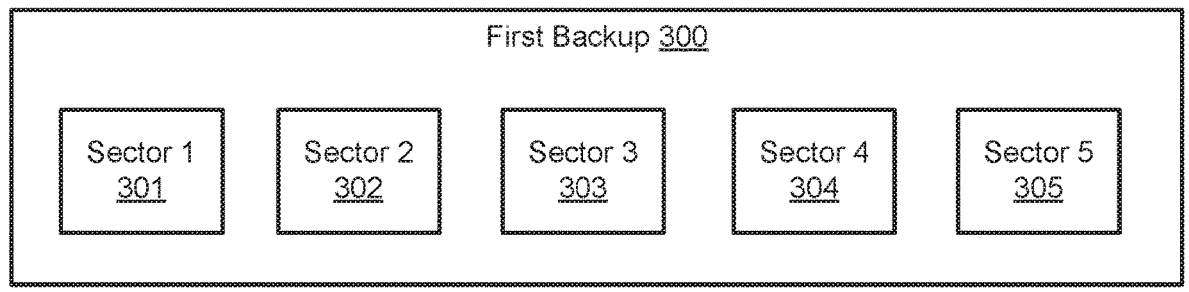
FIGS. 3A-3D show an example in accordance with one or more embodiments of the invention.
Figure 3B:
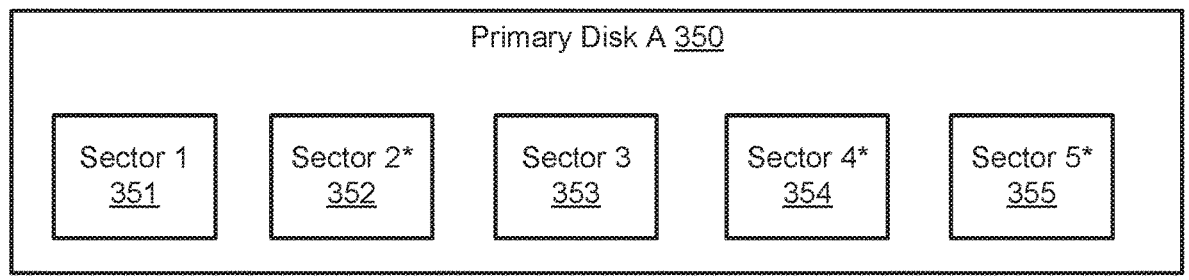

The following section describes an example. The example is not intended to limit the invention. Turning to the example, consider a scenario in which a first backup (FIG. 3A, 300) of Primary Disk A has been created. Following the creation of the first backup, Primary Disk A (FIG. 3B, 350) services three I/O requests. The result of servicing the three I/O requests is that the data in sectors 2, 4, and 5 is modified. The state of Primary Disk A (FIG. 3B, 350) after the aforementioned I/O requests have been serviced is shown in FIG. 3B. The servicing of the three I/O requests also results in the generation of a prior FDTL, which corresponds to the current FDTL (310) at the time the backup initiation notification, was received.

At some later point in time after the three I/O requests have been serviced, a backup initiation notification is received by the filter driver. After receiving the backup initiation notification, the filter driver transitions to backup mode, creates an I/O daemon (not shown), and provides the I/O daemon with the prior FDTL (which includes the following entries: {2, 4, 5}).

Time=T1

Figure 3C:
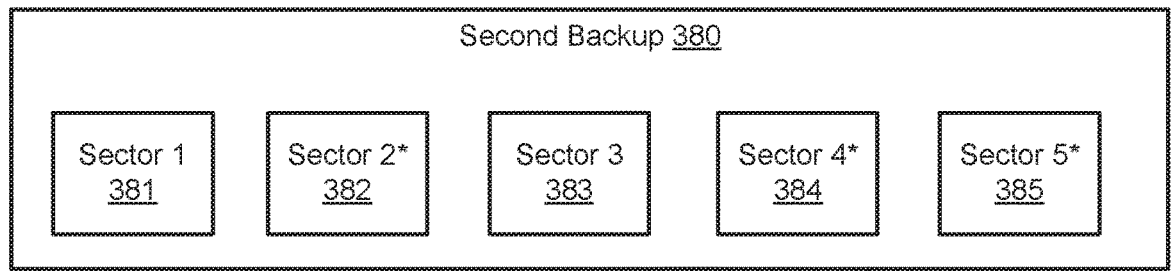

At T1, the I/O daemon starts processing the entries of the prior FDTL. The I/O daemon selects the entry with the lowest sector number (i.e., 2) for processing. The entry is processed in accordance with FIG. 2C and results in data of sector 2 from Primary Disk A (FIG. 3B, 352) being copied in to sector 2 of the Second Backup (FIG. 3C, 382).

Time=T2

At T2, the filter driver receives an I/O request from the virtual machine, where the I/O request specifies new data to be written to sector 5 (355) of the Primary Disk A (350). The filter driver then determines that there is an intersection between the I/O request and the prior FDTL (i.e., an entry associated with sector 5 is present on the prior FDTL and has not yet been read in accordance with FIG. 2C).

In response the determination, the filter driver prompts the I/O daemon selected the entry associated with sector 5 as the next entry on the prior FDTL to be processed. The I/O daemon then proceeds to process the entry associated with sector 5 (355) of Primary Disk A (350). The entry is subsequently processed in accordance with FIG. 2C and results in data of sector 5 from Primary Disk A (FIG. 3B, 355) being copied in to sector 5 of the Second Backup (FIG. 3C, 385).

Time=T3

Figure 3D:
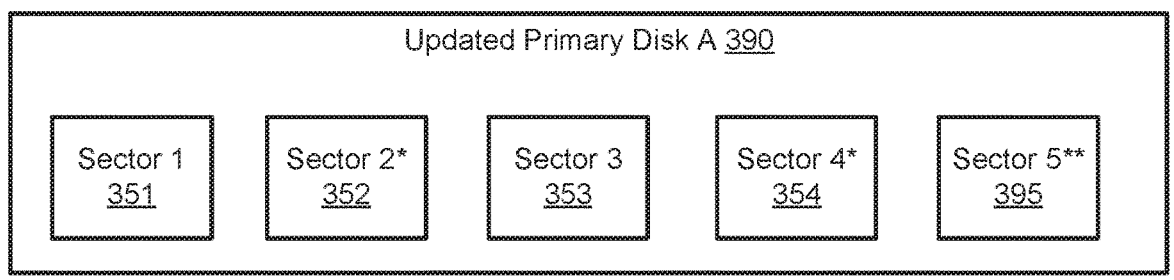
Figure 3D:
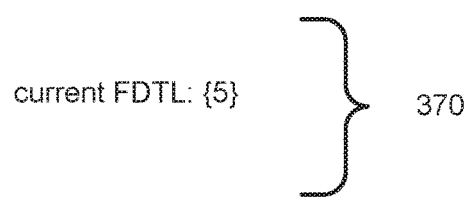

The filter driver, which has previously paused the processing of I/O request by the device driver, provides the I/O request to the device driver. The device driver subsequently services the I/O request, which results in data currently present in sector 5 (i.e., FIG. 3B, 355) being overwritten with new data (i.e., FIG. 3D, 395). The writing of the new data to sector 5 also results in an entry corresponding to sector 5 being written to the current FDTL (370).

Time=T4

At T4, the I/O daemon continues processing the prior FDTL. The I/O daemon selects the next unread entry with the lowest sector number (i.e., 4) for processing. The entry is processed in accordance with FIG. 2C and results in data of sector 4 from Primary Disk A (FIG. 3B, 354) being copied in to sector 4 of the Second Backup (FIG. 3C, 384).

Time=T5

At T5, the I/O daemon determines that all entries in the prior FDTL have been processed. Based on this determination, the I/O daemon sends a notification to the filter driver that backup processing is complete. The filter driver may then transition to non-backup mode in response to the notification.

Though not shown in the example, while the I/O daemon is obtaining data from Primary Disk A (350) to include in the Second Backup (380), data for sectors of the Primary Disk A (350) that are not present on the prior FDTL are copied (by the backup system) from the corresponding sectors in the first backup (300) to the second backup (380). For example, the data in sector 1 (FIG. 3A, 301) is copied to sector 1 (FIG. 3C, 381) in the second backup (380) and the data in sector 3 (FIG. 3A, 303) is copied to sector 3 (FIG. 3C, 383) in the second backup (380).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention may improve the reliability of storing data on a computing device. The reliability may be improved by modifying a method for generating a backup that decreases the use of computing resources and minimizes the latency impact on newly issued I/O requested, while maintaining the functionality of generating a backup. Embodiments of the invention may also reduce the use of computing resources by not requiring the generation of intermediate snapshots.

Thus, embodiments of the invention may address the problem of inefficient use of computing resources. This problem arises due to the technological nature of the environment in which backup policies are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for processing input/output (I/O) requests, the method comprising:
   receiving an I/O request from a virtual machine executing on a host computing device, wherein the host computing device comprises a filter driver;
   making a first determination that the filter driver is in a backup mode;
   based on the first determination, making a second determination that the I/O request intersects with a prior filter driver tracking list (FDTL);
   in response to the second determination:
      pausing, by the filter driver, the processing of the I/O request;
      obtaining, from a primary disk, data associated with the I/O request;
      after obtaining the data, resuming the processing of the I/O request, wherein processing the I/O request results in the data on the primary disk being overwritten with new data.

2. The method of claim 1, further comprising:
   receiving a second I/O request from the virtual machine;
   making a third determination that the second I/O request does not intersect with the prior FDTL;
   based on the third determination, processing the second I/O request, wherein processing the second I/O request results in second new data being written to the primary disk.

3. The method of claim 2, wherein processing the I/O request comprising updating a current FDTL.

4. The method of claim 2, further comprising:
   after transitioning to the backup mode, initiating, by the filter driver, an I/O daemon on the host computing device, wherein the I/O daemon obtains data from the primary disk based on the prior FDTL.

5. The method of claim 4, wherein at least a portion of the obtained data is obtained by the I/O daemon while the second I/O request is being processed.

6. The method of claim 4, wherein the I/O daemon provides the obtained data to a backup system.

7. The method of claim 4, wherein after the I/O daemon obtains all data from the primary disk associated with the prior FDTL, the filter driver transitions to a non-back-up mode.

8. The method of claim 1, further comprising:
   after obtaining the data, providing the data to a backup system, wherein the backup system comprises a backup.

9. The method of claim 8, wherein the prior FDTL specifies which portions of data on the primary disk are different relative to corresponding portions of data stored on the backup.

10. The method of claim 1, wherein the filter driver provides the I/O request to a device driver in the host computing device and wherein the device driver initiates processing of the I/O request.

11. The method of claim 1, wherein obtaining, from the primary disk, the data associated with the I/O request comprises requesting, by the filter driver, that an I/O daemon on the host computing device obtain data from the primary disk.

12. A system, comprising:
a host computing device executing a virtual machine and comprising a filter driver; and
a persistent storage operatively connected to the host computing device and comprising a primary disk;
wherein the host computing device is configured to:
after receiving an I/O request from the virtual machine, make a first determination that the filter driver is in a backup mode;
based on the first determination, make a second determination that the I/O request intersects with a prior filter driver tracking list (FDTL);
in response to the second determination:
pause, by the filter driver, the processing of the I/O request;
obtain, from the primary disk, data associated with the I/O request;
after obtaining the data, resume the processing of the I/O request, wherein processing the I/O request results in the data on the primary disk being overwritten with new data.

13. The system of claim 12, wherein the host computing device is further configured to:
after receiving a second I/O request from the virtual machine, make a third determination that the second I/O request does not intersect with the prior FDTL;
based on the third determination, process the second I/O request, wherein processing the second I/O request results in second new data being written to the primary disk.

14. The system of 13, wherein processing the I/O request comprising updating a current FDTL.

15. The system of claim 12, wherein the host computing device is further configured to:
after transitioning to the backup mode, initiate, by the filter driver, an I/O daemon, wherein the I/O daemon obtains data from the primary disk based on the prior FDTL.

16. The system of claim 15, wherein at least a portion of the obtained data is obtained by the I/O daemon while the second I/O request is being processed.

17. The system of claim 15, wherein the I/O daemon provides the obtained data to a backup system.

18. The system of claim 15, wherein after the I/O daemon obtains all data from the primary disk associated with the prior FDTL, the filter driver transitions to a non-back-up mode.

19. A non-transitory computer readable medium comprising computer readable program code, which when executed by a computer processor enables the computer processor to perform a method, the method comprising:
receiving an I/O request from a virtual machine executing on a host computing device, wherein the host computing device comprises a filter driver;
making a first determination that the filter driver is in a backup mode;
based on the first determination, making a second determination that the I/O request intersects with a prior filter driver tracking list (FDTL);
in response to the second determination:
pausing, by the filter driver, the processing of the I/O request;
obtaining, from a primary disk, data associated with the I/O request;
after obtaining the data, resuming the processing of the I/O request, wherein processing the I/O request results in the data on the primary disk being overwritten with new data.

20. The non-transitory computer readable medium of claim 19, wherein the method further comprises:
receiving a second I/O request from the virtual machine;
making a third determination that the second I/O request does not intersect with the prior FDTL;
based on the third determination, processing the second I/O request, wherein processing the second I/O request results in second new data being written to the primary disk.

* * * * *